(12) United States Patent
Liang et al.

(10) Patent No.: US 9,861,124 B2
(45) Date of Patent: Jan. 9, 2018

(54) ALEXIPHARMIC CIGARETTE FILTER MATERIAL AND THEIR PREPARATION

(76) Inventors: Yonglin Liang, Shandong (CN); Baolu Zhao, Beijing (CN); Ran Tao, Beijing (CN); Xingyi Liang, Shandong (CN)

( * ) Notice: Subject to any disclaimer, the term of this patent is extended or adjusted under 35 U.S.C. 154(b) by 962 days.

(21) Appl. No.: 13/119,237

(22) PCT Filed: Jul. 6, 2009

(86) PCT No.: PCT/CN2009/000763
§ 371 (c)(1),
(2), (4) Date: Mar. 16, 2011

(87) PCT Pub. No.: WO2010/031238
PCT Pub. Date: Mar. 25, 2010

(65) Prior Publication Data
US 2011/0162664 A1   Jul. 7, 2011

(30) Foreign Application Priority Data

| Sep. 17, 2008 | (CN) | 2008 1 0140233 |
| Nov. 13, 2008 | (CN) | 2008 1 0160115 |
| Jan. 1, 2009  | (CN) | 2009 1 0013623 |
| Mar. 29, 2009 | (CN) | 2009 1 0019990 |

(51) Int. Cl.
| A24D 3/00  | (2006.01) |
| A24D 3/06  | (2006.01) |
| A24B 15/16 | (2006.01) |
| A24D 3/02  | (2006.01) |
| A24D 3/14  | (2006.01) |

(52) U.S. Cl.
CPC ............. A24D 3/06 (2013.01); A24B 15/16 (2013.01); A24D 3/0225 (2013.01); A24D 3/0229 (2013.01); A24D 3/0287 (2013.01); A24D 3/14 (2013.01); *A23V 2002/00* (2013.01)

(58) Field of Classification Search
CPC ...... A24D 3/00; A24D 3/0212; A24D 3/0225; A23V 2250/0618; A23V 2250/214
See application file for complete search history.

(56) References Cited

U.S. PATENT DOCUMENTS

| 2,968,306 A |   | 1/1961  | Touey |  |
| 3,319,630 A | * | 5/1967  | Orrmins | A24D 3/14 131/339 |
| 5,105,834 A | * | 4/1992  | Saintsing | 131/334 |
| 7,094,787 B2 | * | 8/2006  | Okubo et al. | 514/272 |
| 2002/0028281 A1 | * | 3/2002 | Omura | 426/597 |
| 2002/0119873 A1 |   | 8/2002 | Heitmann |  |
| 2003/0003130 A1 |   | 1/2003 | Okubo et al. |  |
| 2003/0178038 A1 | * | 9/2003 | Yamashita | A24D 3/14 131/335 |
| 2004/0045566 A1 |   | 3/2004 | Pera |  |
| 2004/0112395 A1 | * | 6/2004 | Enslin | A24B 15/28 131/347 |
| 2004/0134631 A1 |   | 7/2004 | Crooks et al. |  |
| 2006/0237024 A1 | * | 10/2006 | Reich et al. | 131/270 |
| 2008/0029114 A1 | * | 2/2008 | Seitert | A24D 3/048 131/335 |
| 2008/0029115 A1 |   | 2/2008 | Draghetti et al. |  |
| 2008/0053465 A1 |   | 3/2008 | Tarora et al. |  |
| 2009/0014018 A1 | * | 1/2009 | Sengupta et al. | 131/276 |

FOREIGN PATENT DOCUMENTS

| CN | 95116865.7    | 3/1997  |
| CN | 1451326 A     | 10/2003 |
| CN | 1273126 C     | 9/2006  |
| CN | 200987359 Y   | 12/2007 |
| CN | 101143026 A   | 3/2008  |
| CN | 101199363 A   | 6/2008  |
| CN | 101214089 A   | 7/2008  |
| CN | 201092645 Y   | 7/2008  |
| EP | 0001958523 A2 | 8/2009  |

(Continued)

OTHER PUBLICATIONS

Machine Translation of CN1451326A. Originally pulished Oct. 29, 2003.*
Gao, J. et al., "EPR Study of the Toxicological Effects of Gas-Phase Cigarette Smoke and the Protective Effects of Grape Seed Extract on the Mitochondrial Membrane", Applied Magnetic Resonance, 2002, pp. 497-511, vol. 22.
Fajun, Yang et al., "Inhibition Effects of EGCG on Cigarette Smoke Induced Damage to Rat Lung Cells", Acta Biophysca Sinica, 1992, pp. 450-454, vol. 8, Issue 3.

(Continued)

Primary Examiner — Cynthia Szewczyk
(74) Attorney, Agent, or Firm — Maine Cernota & Rardin

(57) ABSTRACT

The present invention relates to an independent, tobacco addiction-dispelling and tobacco toxicity-detoxifying filter, and a process for preparing the same. Said process is characterized in enabling organic substances in tea leaves to exude by air entraining and heating, immersing with a suitable amount of water and stirring, enhancing the effect on dispelling tobacco addiction and detoxifying tobacco toxicity, adding a part of celluloses by using the adhesiveness and water resistant effect of the exuded organic substances to produce tea powder, tea slices and tea particles; packaging the tea powder, tea slices, tea particles and active substances and additives within the filter via a device to form a cigarette holder, a cigarette filter rod or a cigarette holder bullet core having an absorbing resistance controlled to be within the applicable scope. During smoking, the effective substances in the filter volatilizes and sublimes via heat and water vapor in the smoke, sucking force of smoking or an electronic smoking equipment and are absorbed when entering respiratory tract, so as to inhibit nicotine receptor and to achieve the cessation and detoxification effect on cigarette smoking.

4 Claims, 11 Drawing Sheets

(56) References Cited

FOREIGN PATENT DOCUMENTS

| JP | 62232371 A | * | 10/1987 |
| --- | --- | --- | --- |
| JP | 08-266261 | | 10/1996 |
| JP | 2002-37732 | | 2/2002 |
| JP | 2002-097136 | | 4/2002 |
| JP | 2003-274919 | | 9/2003 |
| RU | 2045921 C1 | | 10/1995 |
| RU | 2004113096 A | | 3/2005 |
| RU | 2298998 C2 | | 5/2007 |
| WO | 0000048 A1 | | 1/2000 |
| WO | 2006048767 A1 | | 5/2006 |
| WO | 2007051395 A1 | | 5/2007 |

OTHER PUBLICATIONS

Fajun, Yang et al., "Toxicological Effects of Gas-Phase Cigarette Smoke on Rat Lung Cells and Protection Effects of Green Tea Polyphenols in the System", Environmental Chemistry, 1992, pp. 50-55, vol. 11, Issue 6.

Zhang, Shuli et al., "Cytotoxicity of Gas Phase Cigarette Smoke and the Protection by Green Tea Polyphenols", China Environmental Science, 1996, pp. 386-390, vol. 16, Issue 5.

Office Action for Canadian Patent Application No. 2,740,530, dated Aug. 6, 2012, 2 pages.

Office Action for Ukraine Patent Application No. 2011 04624 dated Aug. 7, 2012, 5 pages.

Russian Office Action dated Dec. 26, 2012 for Russian Application No. 2011115135112 (022439) with English Translation, 10 pages.

Japanese Office Action dated Apr. 10, 2013 for Japanese Application No. JP2011-527180, 2 pages.

PCT Search Report dated Oct. 22, 2009 of Patent Application No. PCT/CN2009/000763 filed Jul. 6, 2009.

Du, Ji-yu et al., The main chemical components of tea Agriculture & Technology, Feb. 28, 2003, 23(1):53-55 see all text.

Russian Office Action dated Jun. 11, 2013 for Russian Application No. 2011115135/12 (022439) with English translation, 11 pages.

European Search Report for Appl No. EP09813959.5 dated Aug. 9, 2013, 12 pages.

Russian Search Report for Russian Appl No. 2011115135/12 (022439) dated Jan. 25, 2015.

PCT Search Report and Written Opinion of Application No. PCT/CN2009/000763 dated Jul. 6, 2016, 10 pages.

EPO OA dated Jan. 26, 2016 for Application No. 09813959.5.

* cited by examiner

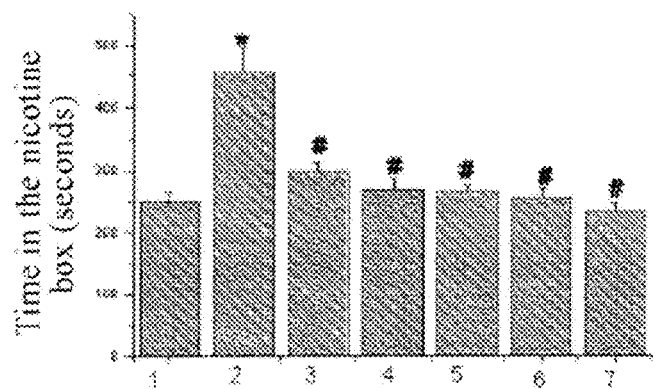
Fig. 7A
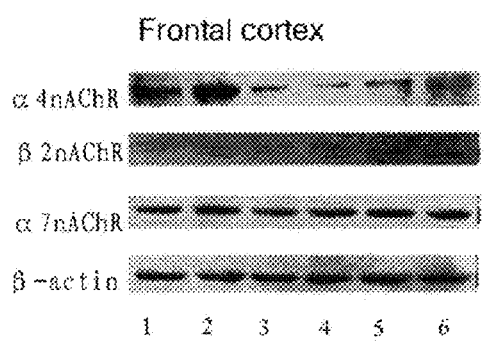
Fig. 7B
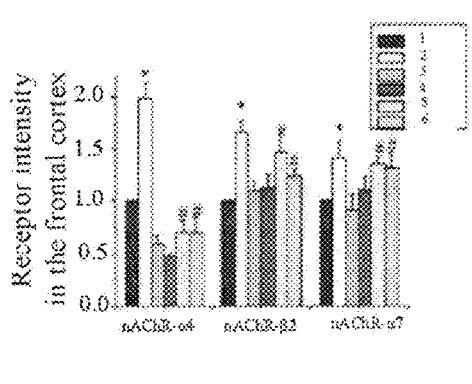
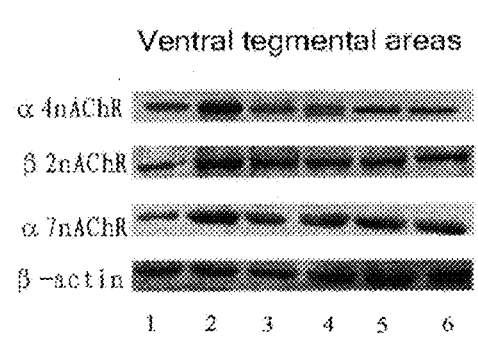
Fig. 7C
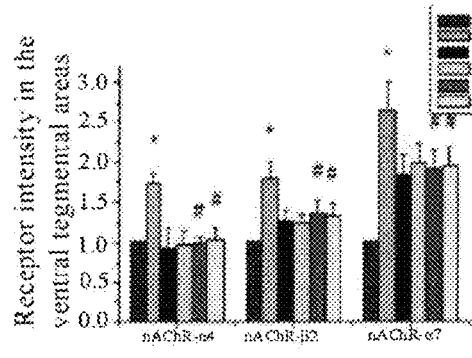

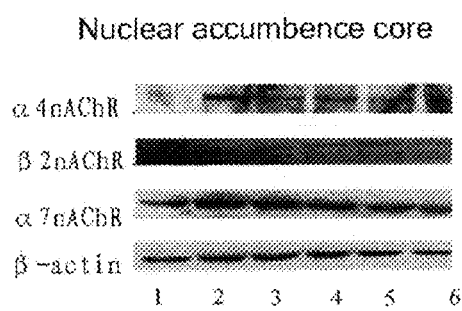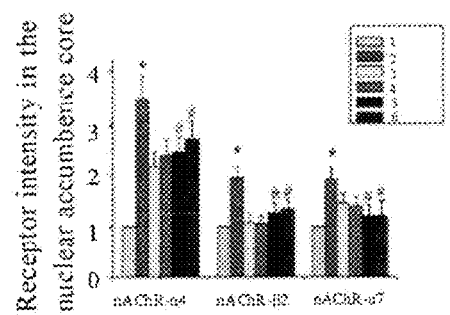
D  Fig. 7D  D1
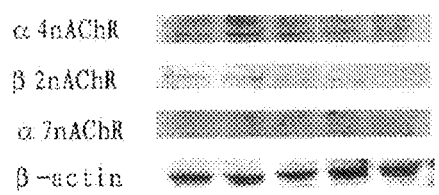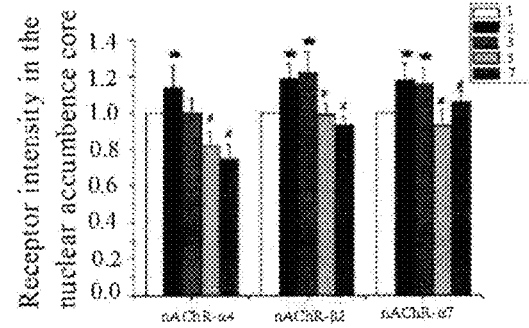
E  Fig. 7E  E1

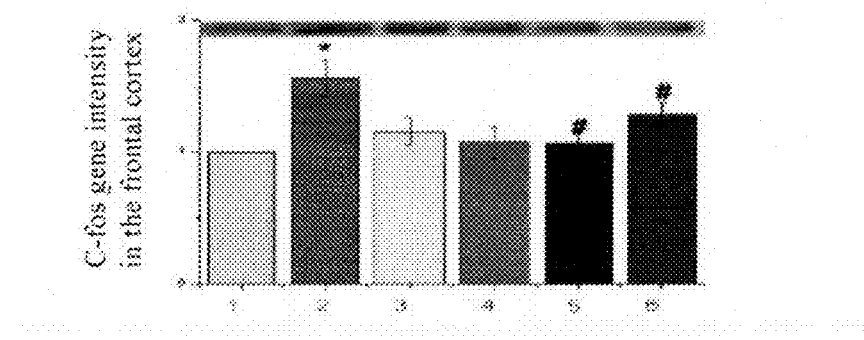
Frontal cortex       Fig. 8A
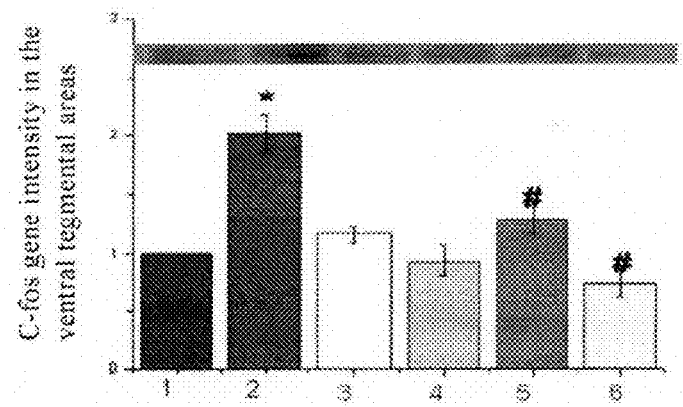
Nuclear accumbence core       Fig. 8B
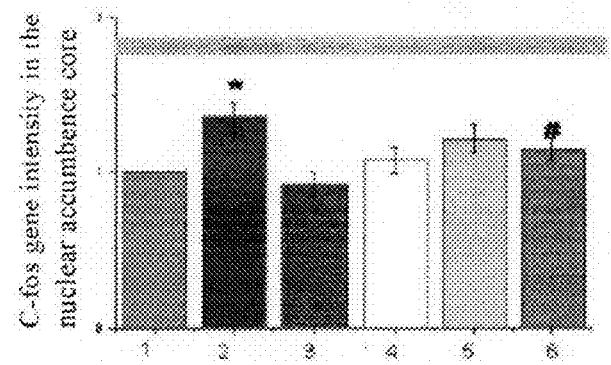
Ventral tegmental areas       Fig. 8C Control of non-smoking　　Control of smoking Smoking with tea cigarette filter tip

ALEXIPHARMIC CIGARETTE FILTER MATERIAL AND THEIR PREPARATION

RELATED APPLICATIONS

This application is a national phase application filed under 35 USC §371 of PCT Application No. PCT/CN2009/000763 with an International filing date of 6 Jul. 2009, which claims priority to Chinese Patent Application Nos. CN20081140233, filed 17 Sep. 2008, CN20081160115, filed 13 Nov. 2008, CN20091013623, filed 1 Jan. 2009, and CN20091019990, filed 29 Mar. 2009. Each of these applications is herein incorporated by reference in their entirety for all purposes.

FIELD OF THE INVENTION

The present invention relates to an independent, tobacco addiction-dispelling and detoxifying filter rod and cigarette holder, and process for manufacturing the same.

BACKGROUND OF THE INVENTION

Smoking may adjust mood of partial individuals, but it is a social consensus that smoking is harmful to health. The World Health Organization (WHO) has listed tobacco danger as one of the major dangers to human health. Due to cigarette addiction, some consumers who hope to conduct physiological regulation by smoking unfortunately have caught tobacco addiction, and are difficult to abstain from smoking through their endeavor. Long-term smoking increases the risks of suffering from cancers, cardiovascular diseases, respiratory diseases and the like, and smoking-induced diseases occupy the social medicare security system resources for a long period of time, so as to enable the society and families to bear exceptional burdens. Many families fall into economic difficulties due to smoking-induced cancers, and the danger of smoking to health is greater than any one of other diseases and becomes one of the major public health problems to humanity. Tobacco addiction-dispelling has become one unavoidable social development process for international community and all the countries in the world.

Currently, nicotine substitutes in the market are greatly debatable and far from perfect, and may form a new dependent risk. Moreover, they are inconvenient and leave out the feelings of smokers, and the smoking cessation thereof is not significant. The more perfect the smoking-control measures are, the more prominent the tobacco torture is, so as to trigger new social problems. Meanwhile, the population desiderates an independent smoking process for mood adjustment since they cannot get rid of smoking in a short period of time, and there is not any new unharmful and independent product to cater for their requirements. At present, the tobacco addiction-dispelling technology by genetic variation in U.S.A. has some shortcomings, such as high cost, difficult to popularize and so on, while the available stop-smoking drugs in the market are difficult to achieve the object of dispelling tobacco addiction due to the toughness of tobacco addiction. Thus an effective tobacco addiction-dispelling cigarette detoxication product for stop-smoking is needed.

Filter rod and cigarette holder are important tools for reducing harmful substances in the cigarette smoke, wherein the so-called filter rod is generally made of the filter medium and plasticizer by rolling with coil paper. One filter rod can be cut into two, four, or six cigarette filter tips. The cigarette filter tip means a filter linking the cigarette directly. The filter medium means substances filled in the filter rod and having the primary filtering function, such as the conventional cellulose acetate filament tow. The so-called cigarette holder represents a tool in the art into one end of which the cigarette is inserted, and through the other end of which the smoke can be smoked by mouth. The current cigarette holder is generally a cigarette holder for filtration, i.e. filtering the cigarette tar by the physicochemical principle so as to make the smoke smoked into mouth velvety and to greatly decrease dangers to health. With the accelerating pace of social progress, people have a growing health awareness, and the conventional cigarette holder cannot keep abreast of times. On the premise that stop-smoking is not really solved, dispelling the tobacco addiction by certain means to reduce the dangers is historically meaningful, which is new mission of the cigarette holder and is the cigarette holder generally acknowledged at present.

Different materials and shapes of the filter rod (especially filter medium) have different effects on the cigarette detoxification and styles, so that it is necessarily to reform the filter rod. The current scientific studies find that the conventional cellulose acetate cigarette holder has a certain effect merely on the decrease of tar, and has little effect on the gaseous phase substance in the cigarette smoke so as to render insufficiencies and defects of cigarette smoke such as pungency, irritation and the like. Moreover, the conventional cellulose acetate cigarette holder has bad effect on the mucous membrane of mouth and respiratory tract, so as to result in damages to mucous membrane, which in turn causes pathological changes. The addition of active carbon and some additives into cellulose acetate cigarette filter tip becomes an effective means for improving and making up the insufficiencies of cellulose acetate cigarette filter tip. However, the effect thereof is not desirable because of the limits of the production process. Tobacco consumer tends to compensate the physiological dependency to cigarettes by increasing the smoking amount and frequencies, so as to have greater hidden dangers to health and safety of tobacco consumers. International communities and organizations and governments all over the world have been concerning abut the increase of diseases and the social problems caused by smoking. Tobacco industry is now faced with a very grim situation; economic security of tobacco changes to political security; and legal risks of tobacco increase year after year. It is looming ahead to alter the current historical situation of facile solution of the cigarette filter tip.

Due to limits by the conventional process for producing filter rod, the functions of active carbon and cellulose acetate filament tow as the filtering material of the filter rod for detoxification and of the filtering material additives are constrained. Some tobacco consumers having awareness of health seek the repeatedly applicable separate filter rod and cigarette holder so as to increase the cigarette quality and reduce the damage. However, the currently available repeatedly-applicable, separate cigarette holders are only superficially attractive but have a higher price and lower function, so that they cannot satisfy the social and market development requirements. Although the composite filter rod and cigarette holder can increase the filtering effect, the measurement of the filter material additive cannot be accurately controlled, nor can it achieve the deserved effect. Thus the breakthrough in the technology and process for either disposal or repeatedly-applicable filter rod and cigarette holder is required to satisfy the political, economical, social and market development requirements. Thus a cigarette filter rod and cigarette holder made by a brand-new process is needed.

Unquenchable and habitual smoking is caused by tobacco nicotine addiction. 70% of the smokers in the world have a desire for stop-smoking, but cannot fulfill the desire because of the characteristics of nicotine. Dispelling tobacco addiction has become a difficult problem in the world. Although the nicotine substitutes are available in the market, the effect thereof is unfavorable, and there is even a certain untoward reaction. It is verified by facts that the process of absorbing the oral stop-smoking drug by alimentary tract cannot achieve the desirable effect, and such process has a high relapse rate. Although the technologies such as perforation of cigarette filter tip, addition of active carbon in the filter rod and cigarette holder and the like have a certain effect on the reduction of tar and nicotine, the decrease of the intake amount of individual cigarette is not equivalent to the decrease of the reception amount, and smokers may compensate the insufficiency of intake amount by increasing the cigarette amount. Dangers of smoking have become a great public health issue to humanity, and the hospitalization costs thereby each year in the world are as much as 200 billion dollars. Thus a filter rod and cigarette holder additives inhibiting nicotine receptor and reducing smoking desire are needed.

Although WHO and governments in the world take a series of strict smoking-control measures, and there are various stop-smoking products in the market, the effects thereof are not significant or desirable. One of the key reasons is that these measures and methods do not take the feelings of smokers into consideration, as well as the human-based scientific and natural law, so that smokers cannot accept, or even react violently. Thus an independent, tobacco addiction dispelling filter rod and cigarette holder acceptable by smokers are needed. On the basis of such situation, the present invention provides an independent, tobacco addiction-dispelling and detoxifying filter rod and cigarette holder and the process for preparing the same, so as to make smokers have no psychological or physiological discomfort, to achieve the object of dispelling tobacco addiction and being independent of tobacco and to be free from tobacco dangers.

SUMMARY OF THE INVENTION

The present invention lies in providing an independent, tobacco addiction-dispelling filter (including the filter for filter rod and cigarette holder) which has the novel process, significant effect, economic and safe effect and is advantageous to human health, and the process for preparing the same, as well as the smoking use of such filter for physiological adjustment. The filter and the preparation process thereof are scientific and easy to apply, and the filter have better taste, characteristic style and anxiety resistance as compared with cigarette and nicotine substitutes. Meanwhile, the filter have the double efficacy of sedation and adjustment, and will not produce any psychological or physiological dependence among smokers. The present invention further provides the smoking use of the independent, tobacco addiction-dispelling and detoxifying filter for physiological adjustment, and comprises any one of or any combination of the active ingredients and/or additives according to various requirements so as to cater for diversified market requirements.

In one embodiment, the filter of the present invention is, for example, comprised in the cigarette holder or filter rod, such as used as the filler for substituting the conventional cellulose acetate filament tow in the filter rod, or used as one part of the cigarette holder or as the whole cigarette holder.

The filler used in the filter rod of the present invention means the functional substances used for filling the packing paper of the filter rod so as to form the filter rod and have the filtering function. In the embodiments of the present invention, the active ingredients means any compound used, for example, comprised in the filter of the cigarette holder or filter rod and helping to dispel tobacco addiction and to detoxify, and particularly including, for example, one or more selected from the group consisting of Y-aminobutyric acid, theanine, tryptophan, glutamic acid and tea alkaloid. In one specific embodiment, the active ingredients are one or more selected from the group consisting of Y-aminobutyric acid, theanine, tryptophan, glutamic acid and tea alkaloid.

In the present invention, the active ingredients themselves can be used directly, for example, pure theanine, glutamic acid and the like. Alternately, the extracts, such as tea extract, comprising the active ingredients, can be used, or natural or synthetic materials comprising the ingredients can be directly used. In one embodiment of the present invention, the active material comprising one or more of the active ingredients is used in the filter such as cigarette holder or filter rod, so as to incorporate one or more active ingredients. The active material may be a natural or synthetic material. In the embodiments of the present invention, for example, the active material is any natural or commercial product useful in the filter of the cigarette filter or filter rod and helping to dispelling tobacco addiction and detoxifying, in particular for example, tea powder, tea particles or tea slices. The active material comprises one or more active ingredients of the present invention. For example, the active material in one specific embodiment is tea powder, tea particles or tea slices.

In addition, the filter of the present inventive may comprise other additives than said active ingredients so as to further help to dispelling tobacco addiction and detoxifying. The additives of the present invention are one or any combination of more selected from the group consisting of bupropion, varenicline, varenicline, rimonabant, dihydroerysodine, dopamine, mecamylamine, cytisine, 3-methyl-aminoisocamphane, baclofen, chlofazoline and butanone.

Organic substances in tea leaves exude by air entraining and heating, or immersing the active materials, such as tea powder, tea slices and tea particles, with a suitable amount of water and stirring. In particular, the dissolution rate of active ingredients from cell walls increases, so as to enhance the tobacco addiction-dispelling effect. A part of fibers are added by using the adhesiveness and water resistant effect of the exuded organic substances to produce tea powder, tea slices and tea particles according to the following procedures. Tea slices generally represent the form of tea leaves having a specific gravity of 25-55 g/m$^2$ and a width of 180-380 mm, preferably having a moisture content of 5-8 wt % and a wrinkle space of 0.8-1.8 mm, more preferably a specific gravity of about 40 g/m$^2$ and a width of 205 mm. Tea particles represent the form of tea leaves having a particle size of 0.01-0.08 mm or higher than 0.08 mm as required under specific circumstances, preferably having a moisture content of 5-8 wt %. Tea powder generally represents the form of tea leaves having a particle size of less than 0.01 mm. Within such ranges, the filter rod will not shrink or collapse.

In one embodiment of the present invention, the active materials are directly comprised in the filter.

In another embodiment, the present invention provides a bullet core, characterized in comprising the filter containing the active ingredients themselves and/or active materials of the present invention. The bullet core of the present invention is an assembly comprising the filter packaged and wrapped in a packaging and comprising the active ingredients themselves and/or active materials. The bullet core of the independent, tobacco addiction-dispelling and tobacco toxicity-detoxifying filter may comprise one or more of the additives. In one embodiment, the bullet core of the independent, tobacco addiction-dispelling and tobacco toxicity-detoxifying filter comprises tea powder, tea particles or tea slices. Tea for preparing said tea powder, tea particles or tea slices may be the tea comprising one or more of the active ingredients of the present invention. The bullet core may be used in the cigarette holder and/or filter rod. Under the circumstance of using the bullet core in the cigarette holder, one of the advantages thereof is easy to install and replace. In addition, the bullet core used in the cigarette holder or filter rod may bring additional technical effect due to the specific construction of the bullet core. For example, a specific internal structure of the bullet core can be designed so as to enable the gas through the bullet core to sufficiently contact with the active materials. The bullet core may be installed with electronic units so as to promote the function of the active materials, for example, by heating, and/or monitoring the consumption of the active materials to give a cue of exhaustion or replacement.

The present invention further provides a process for preparing the independent, tobacco addiction-dispelling and tobacco toxicity-detoxifying filter, characterized in adding into the filter the active ingredients and/or active materials of the present invention. In one embodiment of the present invention, different from the conventional process in which the filler such as cellulose acetate filament tow is continuously fed in a horizontal level and wrapped with packaging paper to form a filter rod, the present invention, especially, uses a process comprising vertical feeding, filling the prefabricated cylindrical packaging paper with the filler, so as form a filter rod. Specifically, the process may include, for example, inserting the filler into the upper end of a prefabricated and vertically placed cylinder or many cylinders distributed in parallel. In order to introduce the active ingredients or materials of the present invention, a section of the active materials are firstly inserted during the production, then a section of filament tow and corrugated paper are injected; subsequently, a section of the active materials are inserted, a section of filament tow and corrugated paper are then injected again; the active materials are finally inserted into the final section, to produce the independent, tobacco addiction-dispelling and tobacco toxicity-detoxifying filter capable of being cut into two, four, or six filters according to the previous procedures.

By using the independent, tobacco addiction-dispelling and tobacco toxicity-detoxifying filter of the present invention, the present invention further provides the use of the active ingredients, active materials and/or additives, for example, the active ingredients, active materials and/or additives in the filter of the present invention for the additives for physiological adjustment and nicotine receptor inhibition and smoking desire reduction, characterized in absorbing the active ingredients, active materials and/or additives of the present invention together with cigarette smoke through respiratory tract.

Moreover, the active ingredients, active materials and/or additives of the present invention can be directly added to tobacco shreds, so as to smoke the active ingredients and/or additive ingredients together with cigarette smoke. They can also be added during the production of tobacco slices, and into chewing tobacco or snuffing tobacco. Additionally, they can also be added to the substitutes of non-conventional cigarette and mixed with non-tobacco shred substance for smoking.

BRIEF DESCRIPTION OF THE DRAWINGS

FIG. 7A-E show the effect of glutamic acid and theanine (No. 1) on the nicotine-dependent (A) and nicotine-induced expression of nicotine receptor in the brain regions of mice. B, B¹: ventral tegmental areas; C,C1: frontal cortex; D, D1: nuclear accumbence core; E, E1: SY5Y. 1. Control; 2. Nicotine; 3. Nicotine+tea polyphenol; 4. Nicotine+caffeine; 5. Nicotine+glutamic acid and theanine in a low concentration; 6. Nicotine+glutamic acid and theanine in a high concentration; 7. Nicotine receptor inhibitor. *As compared with the control, $P<0.01$, #As compared with nicotine, $P<0.05$.

FIG. 8A-D show the effect of glutamic acid and theanine (No. 1) on the nicotine-induced c-fos expression in the brain regions of mice. A: frontal cortex; B: nuclear accumbence core; C: ventral tegmental areas; D: SY5Y. 1. Control; 2. Nicotine; 3. Nicotine+tea polyphenol; 4. Nicotine+caffeine; 5. Nicotine+glutamic acid and theanine in a low concentration; 6. Nicotine+glutamic acid and theanine in a high concentration; 7. Nicotine receptor inhibitor. *As compared with the control, P<0.01, #As compared with nicotine, P<0.05.

Figure 1:
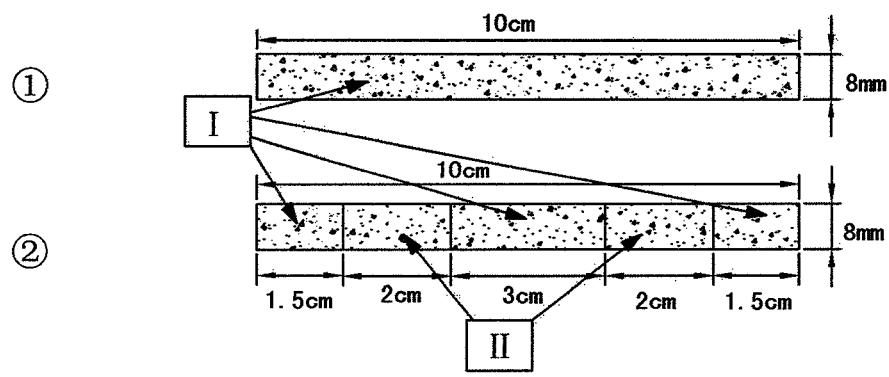
FIG. 1 is the schematic representation of a filter rod form comprising the filter, wherein ① represents a filter rod of the wholly active ingredients and/or active material (I); and ② represents a composite filter rod of the active ingredients and/or active materials with the conventional cellulose acetate filament tow (II).

Each of the figures is used for illustration; and not each of them is drawn strictly to scale, and each of them may be drawn on an increased and/or reduced scale for the purpose of clarity and/or illustration.

DETAILED DESCRIPTION OF THE EMBODIMENTS

Tea leaves and active ingredients thereof have the cardiac, diuretic and central nerve-exciting actions, the anti-fatigue efficacy and the effect of detoxification. Moreover, they further have the nerve-sedative and anti-anxiety effects and the functions of blood vessel dilation and memory improvement. In addition, they have the actions of inhibiting the nerve excitement and improving sleeping, and can promote the growth of brain functions and nerves, so as to improve memory and study functions.

Tea powder, tea slices and tea particles can adsorb smoke off flavour and add aroma quality. Active ingredients in tea leaves have the functions of inhibiting invasion of nicotine to human brains and restraining the dependency of brain receptors on nicotine, have anticonvulsant activity and anti-anxiety effect and can prevent the unpleasant information from being transferred to brain centrum and inhibit the habitual desire for smoking. Moreover, they can also make up the insufficient physiological desire which is resulted from insufficient physiological intensity led by low nicotine content because of harm decrease in the cigarette, so as to achieve the effect of replacing nicotine. In addition, they can remove harmful substances such as free radicals, nitro-samine, benzopyrene, phenols and the like, and can be combined with nicotine to form non-poisonous composites.

By the filter of the present invention, e.g. the filter comprised in the cigarette holder or filter rod, the heat in the cigarette smoke, water vapor and sucking force from smoking during the smoking enable the effective substances in the bullet core to volatize and sublime. One part of the effective substances antagonizes against the smoke substances so as to use up, and the other part enters human lung along with the smoke and is absorbed to exert its efficacy, so as to enable tobacco consumers to effectively get rid of tobacco addiction and smoking invasion and to make it possible for tobacco consumers to smoke selectively according to different physiological changes, which conforms to the traditional Chinese medicine theoretical principle and reflects humanized consumption civilization. A tobacco addiction-dispelling and detoxifying cigarette holder useful for stop-smoking has a great social meaning.

The technological processes of applying the cigarette filter rod and cigarette holder in the present invention is scientific and rational, and further increase the harm-decreasing effect on the basis of the raw materials so as to have a strong applicability. As compared with the processes for producing the conventional disposal filter rod and cigarette holder and repeatedly-applicable cigarette holder, the technological processes in the present invention have the properties of safety, energy-saving and sanity, in particular solving the problems of complexity, high waste and high cost of the second process for the composite filter rod. The cigarette holder is easily acceptable and can increase the high added value of cigarettes. Such cigarette filter rod and cigarette holder cater for the civilization and progress of the current society, and are greatly adaptable to the development of modern tobacco. Either the application of disposal cigarette holder or the application of repeatedly-applicable cigarette holder of the present cigarette filter rod and cigarette holder both reflect the advantages of low cost and high added value.

Figure 4:
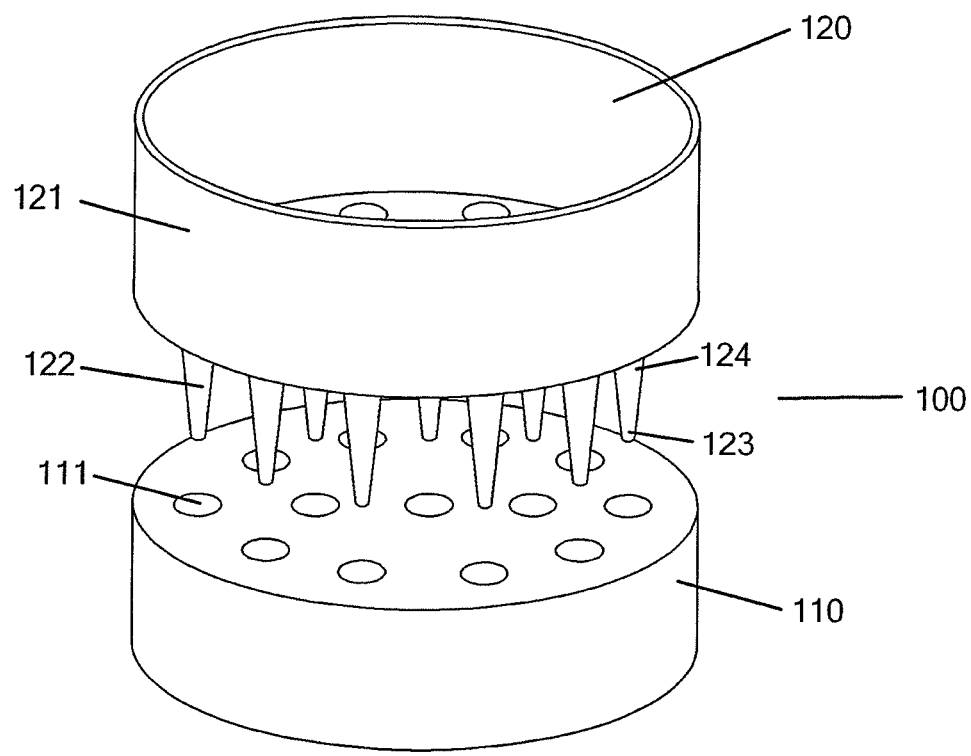
FIG. 4 is the schematic representation of a vertical device for producing the filter rod of the filter.

For example, as for filter rod, the filter is prepared in a form similar to cellulose acetate filament tow used in the conventional filter rod so as to be filled in the filter rod. When the filter is used for producing the filter rod, the active material can be used alone for filling the filter rod, i.e. replacing the conventional cellulose acetate filament tow completely with the active ingredients and/or active material filter I of the present invention, as shown in FIG. 1; or combining the filter I of the present invention with the conventional fillers such as cellulose acetate filament tow, e.g. alternately and sectionally filling the filter of the present invention and the conventional filler 12 in the axially upward direction, as shown in FIG. 4.

Figure 2:
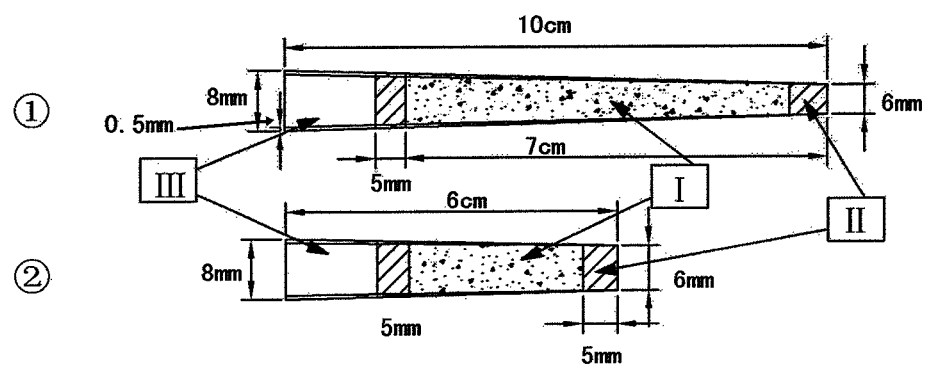
FIG. 2 is the schematic representation of a cigarette holder form of the filter, wherein ① represents using the cigarette holder for five times; and ② represents using the cigarette holder once. The active ingredients and/or active material (I), the conventional cellulose acetate filament tow (II), the truncated cone form, so that one end is inserted into the cigarette (III), and the other end is used for smoking.

Another example is that, as for the cigarette holder, the filter may be formed as the whole or part(s) of the cigarette holder. For example, the filter of the present invention may be shaped to be suitable for smoking, e.g. the form of a truncated cone I as shown in FIG. 1, so as to insert into one end the cigarette and smoking through the other end, and to compose the whole cigarette holder by the filter alone. Such cigarette holder may be the disposal form, or the repeatedly applicable cigarette holder. Alternately, the active materials can be used to replace the part(s) and/or member(s) of the conventional cigarette holder. For example, the active materials can be shaped into the cigarette insertion part I, intermediate part II and/or smoking part III of the conventional cigarette holder, as shown in FIG. 1-2. The active materials of the present invention can be fixed onto the cigarette holder as a part of the cigarette holder, so as to be replaced as an integrity together with the whole cigarette holder, or to be set up as a demountable part onto the cigarette holder so as to replace such active materials from the cigarette holder at irregular or irregular intervals. In particular, a reminding part can be set up on the cigarette holder so as to suggest replacing said active materials.

In one embodiment, the filter comprising any one of the active ingredients and additives of the present invention alone or the combinations thereof can be filled into an aluminum foil, or into a metallic or other packaging materials which are identifiable by aluminium foil or sensors, so as to produce the bullet core. Such bullet core can be provided as a separate product, or as one part to form a kit in combination with the conventional cigarette holder or filter rod or the cigarette holder or filter rod of the present invention. For example, the bullet core of the present invention in combination with the conventional cigarette filter tip (except that which filter tip is designed to be able to load the bullet core of the present invention) can be provided as a cigarette holder kit to the consumers. Another example is that the bullet core of the present invention in combination with the conventional cigarette filter rod (except that which filter rod is designed to be able to load the bullet core of the present invention) can be provided as a cigarette holder kit to the cigarette producers. The packaging materials are perforated electrostatically, so as to control the air permeability within a certain applicable scope. The smoking device is assembled by using electronic devices, microcircuits, processors and sensing heater, such that when smoking the device, the pressure makes the sensors produce signals and transmits the signals to the microprocessors, so as to transfer the electric energy in the electronic devices to the heater. The heater then heats the active ingredients and additives in the identifiable materials to a temperature at which the active ingredients and additives can volatize and/or sublime. The application of such sensor and/or heater provides further specific heating on the basis of heating by the cigarette smoke mentioned above, and promotes the volatilization and sublimation of active ingredients and/or additives. Effective substances are rhythmically inhaled into the respiratory tract by the sucking force of smoking, and the substances entering the respiratory tract are absorbed by the respiratory tract and alveolar capillaries to enter the blood and to exert the efficacy by crossing the blood brain barrier. By using the product of the present invention, users can obtain fragrance of fresh tea and have vigorously physiological intensity. In addition, essential oil in an amount of about 5% by weight of the effective substances can be added to increase the physiological intensity. Such method can also be used for packaging additives, so as to achieve equivalent or synergistic effect.

In one embodiment of the present invention, pure fibers, plastics and/or capsule materials are packaged into a cigarette bullet core to form one separate bullet core or combinations of many series, so as to enrich diversified demands of the market.

FIG. 2 describes several embodiments of the bullet core of the present invention. In FIG. 2, the bullet core is a capsule with one or more pores, e.g. eight pores, at two ends thereof, so as to be convenient for the cigarette smoke entering the capsule, contacting with the active ingredients and/or active materials, and being discharged from the pore(s) at the other end thereof. In another embodiment, the capsule may be a conventional capsule, e.g. commercially available capsule useful in medicaments. In another embodiment, the bullet core is a spiral bullet core having an external diameter as shown in FIG. 2 and having many spiral openings at the bottom thereof, e.g. six spiral openings. When the gas flow passes through the bullet core, it proceeds in the bullet core in the spiral manner, so as to increase the opportunity of contacting with the active substances in the gas flow domain, wherein (I) represents the active ingredients and/or active materials, and (II) represents the conventional cellulose acetate filament tow (II).

Active ingredients in tea powder, tea slices and tea particles have not only the efficacy of separate action, but also the synergistic action. According to different consuming groups, the active ingredients can be divided into the separate substance, and the mix and match of two or more substances, so as to form the combinations of series of products. Various active materials and/or active ingredients are packaged into cigarette holder bullet core with pure fibers, plastics and/or capsule materials, wherein two ends of the bullet core materials are perforated electrostatically. Particularly, when the filter of the present invention is used as the cigarette holder, the cigarette holder is turned on and divided into two sections; the bullet core comprising the effective substance is taken out and installed into the reserved magazine of the cigarette holder; then the cigarette holder is twisted on, and the cigarette is installed in.

The technological process for producing the cigarette filter rod and cigarette holder of the present invention firstly changes the conventional method for producing cigarette holder. The production method by using the conventional composite cigarette holder forming machine comprises horizontally and continuously feeding the fillers, e.g. cellulose acetate filament tow, packaging with the packaging paper the fillers to form a filter rod, wherein the fillers are fed in a line into the opening at one end of the pipelines of the production device; a composite cigarette filter is combined from two materials inside the device, and then expelled from the opening at the other end. During the production, the materials of the filer rod horizontally proceed along with the pipelines, so as to limit the production capability thereof. The production of the filter rod and cigarette holder of the present invention relates to a vertical production process, which hugely increases the production capability.

In the production process of the present invention, a vertical device for producing the filter rod is particularly used to form a filter rod by filling the prefabricated cylindrical packaging paper with the fillers. Specifically, the process may comprise, for example, inserting filler into the upper end of a prefabricated and vertical cylinder or many cylinders distributed in parallel. For example, by reference to FIG. 4, the device 100 primarily comprises a receiver 110 and a dispenser 120. The receiver 110 comprises one or more cylindrical concaves 111 and has an internal diameter matching with the external diameter of the filter rod to be produced; the dispenser 120 comprises a hopper 121 for feeding, and a feeder head 122 for feeding the materials into the concave 111 of the receiver 110. The feeder head is a truncated cone, wherein the diameter of the conule 123 at the bottom thereof is slightly less, e.g. by 5-8 mm, preferably about 6 mm, than the diameter of the cone bottom 124. Meanwhile, the external diameter of the conule 123 is 1-2 mm less than the internal diameter of the concave 111, so as to be convenient for the feeder head 122 to being inserted into the concave 111.

Said receivers and dispensers can be in the commonly used and/or generally acceptable shapes in the art, e.g. circular, quadrangular shapes and the like. Preferably, the receivers and dispensers are consistent in the shape. The receivers may be set up with one or more concaves, each of which may be arranged in various conventional schemes. For example, the concaves may be rectangularly arranged in rows and lines, or within the circular range as shown in FIG. 4. Alternately, the concaves may be radially arranged. Preferably, the arrangements can be optimized so as to set up concaves on the receivers in a unit area as many as possible. Preferably, the arrangement of the feeder heads on the dispensers corresponds to the dispensers.

During the production, the materials, e.g. fillers, such as active materials, are fed into the hopper 121, and into various feeder heads 122 by gravity for example. The concave 111 of the receiver 110 is set up beforehand with the cylindrical packaging paper 112 for packaging the filter rod. The dispensers move downwardly so as to enable the conule 123 of each feeder head 122 to enter the corresponding concave 111. Under the gravity and additional compressive force, the fillers fill the packaging paper 112. After discharging, the filled filter rod is then obtained. In the embodiment in which the active materials of the present invention and the conventional fillers, e.g. cellulose acetate filament tow, are sectionally and alternately filled, one or many receivers 110 correspond to a plurality of dispensers 120, and the specific amount of the dispensers is determined by the type number of the fillers. Generally, one dispenser is used for one filler.

Alternately, a single dispenser can also be used for dispensing more than one filler. Under such circumstances, said single dispenser can be connected with a plurality of feeding channels, which are preferably consistent with the type number of the fillers. When it is required to switch different fillers to be dispensed into the receivers, it just needs switching within different channels connected with the dispenser.

In one embodiment A, the active materials of the present invention and cellulose acetate filament tow are used, and correspondingly, one receiver 110 and two dispensers 120 and 120a (not shown in the drawings) are used therein and have the active materials and cellulose acetate filament tow respectively. During the production mentioned above, the dispenser 120 having the active materials injects a section of filler composed of the active materials into the packaging paper 112 in the first round; the dispenser 120 then leaves the receiver 110; a similar injection process in the second round is repeated by the other dispenser 120a, so as to inject a section of the filler composed of the cellulose acetate filament tow into the packaging paper 112. Thus a filter rod structure in which the active materials and cellulose acetate filament tow are distributed in an alternate manner once is obtained by two rounds of injection. When necessary, the aforesaid alternate injection process of the dispensers 120 and 120a may further be repeated many times, so as to form by many rounds of injection the filter rod in which the active materials and cellulose acetate filament in the fillers are axially, sectionally and alternately arranged many times.

Obviously, more dispensers 120 can be used for one receiver. Generally, one dispenser comprises one filler.

In an embodiment B, the active materials of the present invention and cellulose acetate filament tow are used, but two receivers 110 and 110a (not shown in the drawings) and two dispensers 120 and 120a are used therein. During the production, the receivers 110 and 110a both are loaded with the same packaging paper; the dispenser 120 is filled with the active materials of the present invention; and the dispenser 120a is filled with cellulose acetate filament tow. Firstly, the active material is injected from the dispenser 120 into the receiver 110 in the first round. At this time, the receiver 110a and the dispenser 120a have a bye. Subsequently, the dispenser 120 is transferred to the receiver 110a, so as to inject into the receiver 110a the active materials in the second round. Meanwhile, the dispenser 120a is transferred to the receiver 110, so as to inject into the receiver 110 cellulose acetate filament tow in the second round. After said two rounds of injection, the dispenser 110 has achieved the distribution of the active material and cellulose acetate filament tow in an alternate manner once; while in the dispenser 110a, only the active material is injected, which is correspondingly called 0.5 time of distribution therein for the convenience of description.

The dispenser 120 is then re-transferred into the receiver 110, and the active materials are injected in the third round, so as to achieve 1.5 times of distributions in the receiver 110. Meanwhile, the dispenser 120a is transferred into the receiver 110a, and cellulose acetate filament tow is injected in the third round, so as to achieve the 1 time of distribution in the receiver 110a. Thus it can be seen that total 2.5 times of distributions are achieved by total three times of injections. After the filter rod product having the required distribution times is obtained, the product is discharged. For example, if the structure in which the active materials and cellulose acetate filament tow are distributed in an alternate manner once (1 time of distribution) is merely used as the product, i.e. there is only the distribution in an alternate manner once, the filter rod obtained in the receiver 110 will be discharged after the second round of injection so as to feed new packaging paper. Similarly, the filter rod obtained in the receive 110a after the third round of injection will be discharged. Preferably, discharging and feeding of new packaging paper are achieved during the transferring period, so as to fulfill the continuous production at the injection intervals.

In the embodiments above, one active material of the present invention and one current filler (cellulose acetate filament tow) are used for illustration. According to the detailed discussions therein, those skilled in the art can readily understand that these technical solutions can be similarly used for carrying out various active ingredients, active materials and/or additives of the present invention, by combining with or not combining with the fillers in the prior art, e.g. cellulose acetate filament tow.

For the purpose of the present invention, one receiver or one dispenser is called 0.5 set of device, and one receiver together with one dispenser are called one set of derive. According to the discussions above, it can be seen that, under the circumstance of using the active materials of the present invention and cellulose acetate filament tow, one distribution is obtained by carrying out two rounds of injection via 1.5 sets of device in Scheme A, i.e. 0.5 distribution per injection, 1.5 distributions via three rounds of injection, so as to obtain n/2 distributions via n rounds of injection. In Scheme B, 2.5 distributions are obtained by three rounds of injection using two sets of devices. Upon calculation, except for 0.5 distribution in the first round of injection, one distribution may be achieved per injection, so as to achieve 0.5+(n−1)=n−0.5 distributions via n rounds of injections, which is n/2−0.5 distributions more than Scheme A. The ratio of the distribution times achieved by different schemes via n rounds of injection is defined to be the efficiency coefficient η, so that the efficiency coefficient η of Scheme B relative to Scheme A is $$\eta = \frac{n - 0.5}{n/2} = 2 - \frac{1}{n}.$$

In the industrial production, the production is usually conducted continuously, so that the efficiency coefficient η of Scheme B relative to Scheme A tends to 2, i.e.

$$\lim_{n \to \infty} \eta = 2.$$

For example, it can be seen according to the analyses above that, after 1,000 rounds of injection, Scheme A will achieve 500 times of distribution, while Scheme B will achieve 999.5 times of distribution. Thus η has achieved to 1.999.

Similarly, under the circumstance of more than two fillers, e.g. three, four, five or more, one receiver and a plurality of dispensers may be used as stated in Scheme A, wherein the amount of the dispensers is preferably equivalent to the type amount of the fillers; or a plurality of receives and a plurality of dispensers may be used as stated in Scheme B, wherein the amount of the receives is the same amount as that of the dispensers, and is preferably equivalent to the type amount of the fillers. According to the analyses above, those skilled in the art can readily calculate that the efficiency of Scheme B is obviously greater than that of Scheme A, with the cost of additional (n−1) receivers used in Scheme B than those in Scheme A for n types of the fillers. For example, when one of said active materials, one additive of the present invention and one cellulose acetate filament tow are used, one receiver and three dispensers can be used as stated in Scheme A, or three receivers and three dispensers can be used as stated in Scheme B.

In addition, those skilled in the art can readily deduce that, as for Scheme A, when x types of the fillers are used, more than one (it is assumed that there are y) receivers and xy dispensers may be used. Similarly, as for Scheme B, when x types of the fillers are used, more than one set (it is assumed that there are z sets) devices, i.e. xy receivers and the corresponding xz dispensers, may be used.

Thus those skilled in the art can readily consider using the complete batch production of Scheme A and continuous production between batches of Scheme B according to the equilibrium relationship between the time efficiency cost and device cost.

In the present invention, wood pulp is generally used to be prepared into the cylinders satisfying the circumference and hardness standards of cigarette holders. Likewise, cardboard can also be used to prepare the cylinders satisfying the standards of cigarette holders. The present invention is not restricted by any specific ratio of wood pulp, active materials and additives to filament tow. Firstly, the filament tow and corrugated paper are used to fill one end; the cylinders are vertically set up to downwardly infuse the additives from the top; per 2 centimeters of the additives, filament tow and corrugated paper in a length of one centimeter are further inserted; subsequently a section of the additives are infused, and a section of filament tow and corrugated paper are then inserted. Such process may accurately determine the accuracy of the infused additives, and the stability of sucking resistance of the cigarette filter tip, and will not result in any reduced filtering effect due to the airgap in the additive section of the cigarette filter tip. Moreover, such process can be used to produce according to the requirements the filter rod which can be cut into 2, 4 or 6 filter rods. The advantages of the present process lie in the effects on increasing the production capability, reducing waste and enhancing the function of the cigarette filter tip.

The scope of the present invention does not exclusively represent some certain material, so that the materials used in the described process are illustrative, rater than limitative. On the contrary, those skilled in the art can obviously and reasonably replace by combining with the professionally technical knowledge one or more materials therein with other needed materials so as to fulfill the process of the present invention. As for independent, repeatedly-applicable cigarette holder, wood pulp in combination with aged tea leaves (pulverized) can be pulped, homogeneously stirred, stuffed into a cigarette holder mould, moulded, dried and burnished to enhance the adhesiveness of the materials, wherein the external surface thereof is decorated with aluminium foil and tinfoil.

In addition, the filter comprising the active ingredients and/or active materials of the present invention is introduced, e.g. in the form of filling in a bullet core, into a cigarette holder in the conventional form. For example, it can be designed that the cigarette holder structure can be turned on; a bullet core is placed therein; the initial filter core may be taken out per cigarette or a certain number cigarettes, and replaced with a new bullet core; such a cigarette holder can be continuously used many times.

The usage times of the bullet core can be determined by the predetermined times and/or predetermined conditions. For example, the bullet core may be designed to replace per cigarette, or to replace after smoking a predetermined amount of cigarettes, e.g. 2, 3, 4, 5 or more cigarettes, by changing the amount of active ingredients and/or active materials in the bullet core.

Alternately, the bullet core can be designed to be replaceable when certain conditions are achieved. For example, sensors of one or more active ingredients are installed in the bullet core. When the active ingredients in the bullet core are used up or are in an amount lower than the threshold value at which the efficacy thereof is exerted, such sensors give an alarm which includes but is not limited to sound and/or light signals.

More important, the objects to be sprayed with active ingredients and additives onto the cigarette filter tip materials are not restricted. Generally, cellulose acetate filament tow is sprayed with active ingredients during the opening process of the cigarette filter forming machine, and there is no special limits to the amount of active ingredients and additives added to active carbon, filtering paper and filament tow. The active materials sprayed with active ingredients and additives have new effects. The cigarette filter tip, in particle cigarette filter tip added with active ingredients and additives, is more suitable for the requirements on the development of the current society and modern tobacco.

The present invention provides active ingredients and additives of the filter rod and cigarette holder for inhibiting nicotine receptor and reducing smoking desire. As compared with the conventional cigarette holder, the present active ingredients and additives of the filter rod and cigarette holder for inhibiting nicotine receptor and reducing smoking desire essentially reduce the smoking amount of smokers, avoid the opportunity of contacting tobacco cancerogenous substances with human body, and avoid dependent and habitual smoking behaviors due to tobacco addiction. Such active ingredients and additives of the filter rod and cigarette holder for inhibiting nicotine receptor and reducing smoking desire can be combined with each other according to different consumption types, so as to be added in the form of one alone or the mixture of more of such active ingredients and additives into disposal and repeatedly-applicable cigarette holders.

During smoking, water vapor and hot gas flow in cigarettes and sucking force of smoking enable the additives in the filter rod and cigarette holder to be volatized and drawn out, to occupy the receptor positions against nicotine, to exclude nicotine, to reduce the opportunity of combining nicotine with the receptors, to exert a certain compensation effect and to have the effect of partially replacing nicotine. Such method is superior to the oral effect, and reduces the tobacco addiction risks from the sources.

As for the active ingredients or additives in the filter rod and cigarette holder for inhibiting nicotine receptor and reducing smoking desire, the active ingredients and additives can also be added into the disposal and repeatedly applicable filer rod and cigarette holder, and also into tobacco shreds. In addition, the active ingredients or additives in the present invention can also be added to the non-conventional tobacco shred, chewing tobacco, snuffing tobacco, or tobacco substitutes to achieve the object of dispelling tobacco addiction. According to the analyses above, those skilled in the art can readily and selectively apply one or more embodiments of cigarette holder and/or filter rod into tobacco shred and/or tobacco substitutes, so as to incorporate the active ingredients, active materials and/or additives of the present invention, and can apply in combination with the fillers from the prior art. The filter comprising the active ingredients or additives, provided by the present invention for inhibiting nicotine receptor and reducing smoking desire, has great social benefits and economic prospect.

EXAMPLES

The object of the present invention can be achieved, for example, by the following illustrative, rather than limitative examples.

Example 1

Production of Tea Slices 1 ton of tea leaves (Laoshan Maofeng tea, Tsingtao Zhongpin Tea Co., Ltd) was pulverized into powder. Clean water in an amount of 5% by weight of tea leaves was added and homogeneously stirred. The mixture was heated in a steam vat at a temperature of 80° C. for 5 min, stirred and pulped for 15 min. Organic substances of tea sufficiently exuded to enhance the adhesiveness and water resistance. Celluloses in an amount of 40% by weight of tea leaves were added to produce 40 g/m$^2$ tea slices with the current slurry paper-making technological process, which were cut into a width of 205 mm while rewinding and had a moisture content of 5-8%.

Example 2

Production of Tea Particles 1 ton of tea leaves (Laoshan Maofeng tea, Tsingtao Zhongpin Tea Co., Ltd) was pulverized into powder. Clean water in an amount of 5% by weight of tea leaves was added and homogeneously stirred. The mixture was heated in a steam vat at a temperature of 80° C. for 5 min, and stirred for 30 min. Organic substances of tea sufficiently exuded from cell walls to enhance the adhesiveness. The heated or stirred tea powder could form tea particles by shaking of the sieve. The particle size was determined by the meshes of the sieves, wherein the particles through the first layer of sieves have a particle size of 1.8 mm; the particles through the second layer of sieves have a particle size of 1.2 mm; the particles through the third layer of sieves have a particle size of 0.8 mm. Tea particles were naturally dried or baked by heating in doors, so as to satisfy the addition amount of filter rod and cigarette holder and have no effect on the stability of sucking resistance of smoking.

Example 3

Production of Tea Filter Rod

In this example, the filer rod was prepared according to the standard production technology of cigarette filter tips (Nantong Cigarette Filter Tip Co., Ltd, binary compound machine, type ZL23 forming machine). The opening roller of the filter rod forming machine was dismantled, and the hobbing for crushing tea slices was installed, wherein two hobbings were vertically symmetrical, and the chisel edge space was controlled to be 1.8 mm. Tea slices were crushed to a semi-wrinkle form when passing through the hobbings, and the semi-wrinkle tea slices entered the filter rod synthesizing machine for synthesizing the filter rod. As for the hardness and sucking resistance of smoking of the filter rod, the bulking intensity of tea slices was adjusted by increasing or decreasing the hobbing pressure so as to achieve the filling plumpness of the filter rod.

Example 4

Production of Bullet Core of Tea Particles 1 ton of tea particles obtained according to Example 1 above was weighed, and packaged with calcium-added hard capsules having a diameter of 0.75 cm and a length of 2.5 cm as the packing material for active ingredients and additives. At two ends of the bullet core materials, there were eight regular micropores respectively which enable the substance to be difficult to escape therefrom, and the bullet core was placed in the reserved magazine of the cigarette holder which can be twisted off. During smoking, smoke passed through micropores at two ends of the bullet core, and smoke heat, water vapor and sucking force of smoking would enable the effective substances in the bullet core to volatize and sublime, to enter oral cavity and lung so as to exert the efficacy thereof.

Example 5

Production of Electronic Cigarette Filter

The active ingredients and additives were packaged into the bullet core with materials identifiable by aluminum foil sensors. Electrostatic perforation controlled the air permeability at two ends of the packaging materials within a certain applicable scope. The bullet core was installed into an apparatus of the combination of replaceably electronic device, microcircuit and sensing heaters. Signals were produced from the sensors by sucking of smoking and pressurizing, to transfer electric energy in the electronic device to the heater, to heat the effective substances in the package to a volatilizable and sublimable temperature, i.e. 115° C., and to absorb the effective substances into respiratory tract so as to exert the efficacy thereof.

Example 6

Production of Disposal Filter Rod 1 ton of wood pulp (Shandong Asia Pacific SSYMB Pulp & Paper Co., Ltd) was used as the basic material for the filter rod. The shaped cylinders having a diameter of 0.8 cm and a length of 6 cm were produced. The filament tow was inserted into one end till a depth of 0.5 cm; the end into which the filament tow was firstly inserted is used as the bottom; the cylinders were set vertically in parallel and infused with the additives till a depth of 3 cm downwardly; then a section of filament tow was inserted along with the move of the orbit till a depth of 1 cm; the additives were further infused till a depth of 3 cm; a section of filament tow was inserted till a depth of 0.5 cm, to produce a filter rod capable of being cut into four cigarette filter rods. The length of the filament tow at two ends was 0.5 cm; the intermediate section had a length of 1 cm; and the additives were infused with a length of 1.5 cm.

Example 7

Production of Disposal Bullet Core 1 ton of wood pulp (Shandong Asia Pacific SSYMB Pulp & Paper Co., Ltd) and 1 ton of aged tea leaves (pulverized) were stirred with 100 kg of clean water, homogeneously pulped, pour-formed with a cigarette holder mould, dried, and polished. The active ingredients and additives in an amount of 20% by weight of the bullet core were sprayed and dried to form the final bullet core. For each cigarette, one bullet core may be replaced.

Test Examples

In order to certify the functions of the independent, tobacco addiction-dispelling and detoxifying filter rod and cigarette holder for inhibiting nicotine receptor and reducing smoking desire, the following test examples are used for illustration.

1. Animal test results of dispelling nicotine-dependent addiction with glutamic acid and theanine.

Animal tests were conducted by using mice as models. Upon injection of nicotine and various possible smoking- and nicotine-dependent addiction dispelling ingredients in tea leaves to animals, the results showed that mice obviously has nicotine-dependent behaviors two weeks after injection of nicotine alone, while the mice simultaneously injected with glutamic acid and theanine had the nicotine-addiction dispelling action (see FIG. 1 for details).

2. Clinical results of dispelling smoking-dependent addiction with tea filter rod and cigarette holder In order to further determine the tobacco addiction-dispelling effect of tea filter rod and cigarette holder, clinical observation was conducted in Beijing Military Hospital. By questionnaire before tests, 200 healthy male volunteers aged 18-65 years were collected and divided into two groups for the tests, i.e. the group smoking the control cigarette and the group smoking the cigarette with tea filter rod and cigarette holder. There were professional medical workers to track and detect the amount of the exhaled carbon monoxide, to collect blood samples and urine samples. Conventionally physical check-up was conducted before, during and after tests. It was found that 100 volunteers smoking cigarettes with tea filter rod and cigarette holder had an obviously decreased smoking amount (by 54%) after 4 weeks and a decreased smoking amount by about 85% after two months, wherein the effective ratio of smoking-control (defined as obviously decreased smoking amount as compared with that before using the tea filter rod and cigarette holder) and the success ratio of dispelling tobacco addiction (defined as less than 5 cigarette per day, no smoking dependency or smoking desire, no symptom caused by stop-smoking under the circumstance of no cigarette supply) were respectively 90% and 71%, which both were significantly better than the tobacco addiction-dispelling effect of nicotine patch disclosed in the prior documents (see FIG. 2A). In addition, there were 3 volunteers smoking 4-5 cigarettes per day before tests, and substantially being independent on smoking. After two months, the smoking amount of these 3 volunteers was reduced to 0-2 cigarettes, which showed that the filter rod with such tea slices and tea particles would not be addictive for those without any tobacco addiction. In the control group, the smoking amount of 82 volunteers was not obviously decreased (the one-month tobacco addiction-dispelling ratio and success ratio were merely 6.8%) (see FIG. 2B). The amount of carbon monoxide exhaled according to the tracking test, and nicotine and cotinine in the urine sample were also obviously decreased (see FIG. 2C). Upon physical check-up, it was found that there was no abnormal side effect.

3. Mechanism of dispelling smoking-dependent addiction with tea filter rod and cigarette holder (nicotine-dependent addiction dispelling action of glutamic acid and theanine)

Figure 3:
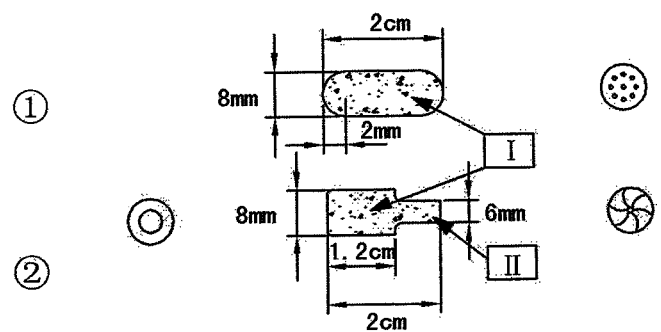
FIG. 3 is the schematic representation of a bullet core of the cigarette holder comprising the filter, wherein ① represents a plastic bullet core; and ② represents a spiral bullet core with six spiral openings at the bottom thereof. When a gas flow passes through the bullet core, it proceeds in the bullet core in the spiral manner, so as to increase the opportunity of contacting with the active substances in the gas flow domain. The active ingredients and/or active materials (I), the conventional cellulose acetate filament tow (II).

Smoking dependency was primarily the result of the effect of nicotine in tobacco on nicotine receptor in the brain of smokers. Animal tests were conducted by using mice as models. The results showed mice injected with nicotine, glutamic acid and theanine may obviously reduce the nicotine dependency, and has the effect similar to nicotine receptor inhibitor (see FIG. 3). Thus we made studies on the inhibition of glutamic acid and theanine (see Table 1) against the enhancement of nicotine-induced nicotine receptor expression and the upstream gene c-fos expression in the brain regions of mice, studies on the effect of glutamic acid and theanine against the enhancement of nicotine-induced tyrosine hydroxylase expression and release of dopamine in the brain regions of mice, and studies on the effect of glutamic acid and theanine on the nicotine-induced sugar metabolism activity in the brain region of mice. The results showed that the nicotine addiction-dispelling action of glutamic acid and theanine in tea slices was fulfilled by inhibiting the enhancement of nicotine-induced nicotine receptor expression in the brain regions.

TABLE 1

| Glutamic acid/theanine weight ratio | | | |
|---|---|---|---|
| Serial No. | Glutamic acid/theanine (weight ratio) | Glutamic acid (mg) | Theanine (mg) |
| 1 | — | 0 | 300 |
| 2 | 1:9 | 30 | 270 |
| 3 | 2:8 | 60 | 240 |
| 4 | 3:7 | 90 | 210 |
| 5 | 4:6 | 120 | 180 |
| 6 | 5:5 | 150 | 150 |
| 7 | 6:4 | 180 | 120 |
| 8 | 7:3 | 210 | 90 |
| 9 | 8:2 | 240 | 60 |
| 10 | 9:1 | 270 | 30 |
| 11 | — | 300 | 0 |

4. Inhibition of glutamic acid and theanine against the enhancement of nicotine-induced nicotine receptor expression in the brain regions of mice Mice having an apparent nicotine dependency two weeks after injection with nicotine had obvious enhancements of the expression of three subtypes (4, 2 and 7) of nicotine receptor (nAChR) primarily in three brain regions (ventral tegmental areas, frontal cortex and nuclear accumbence core), while the enhancements of the expression of the three subtypes of nicotine receptor (nAChR) in the three brain regions of mice injected with glutamic acid and theanine (No. 1) were obviously inhibited (see FIG. 3). It was found that other nicotine receptors in other brain regions are not obviously affected.

5. Inhibition of glutamic acid and theanine against the enhancement of nicotine-induced c-fos expression in the brain regions of mice.

c-fos was the upstream gene of the nicotine-activated nicotine receptor. The inhibition of glutamic acid and theanine (No. 1) against the enhancement of nicotine-induced c-fos expression in the brain regions of mice was detected. The results showed that the c-fos expression primarily in three brain regions (ventral tegmental areas, frontal cortex and nuclear accumbence core) of mice having an obvious nicotine dependency two weeks after injection with nicotine was obviously increased, while the enhancement of c-fos expression in these three brain regions of mice injected with glutamic acid and theanine was obviously inhibited (FIG. 4).

Figure 5:
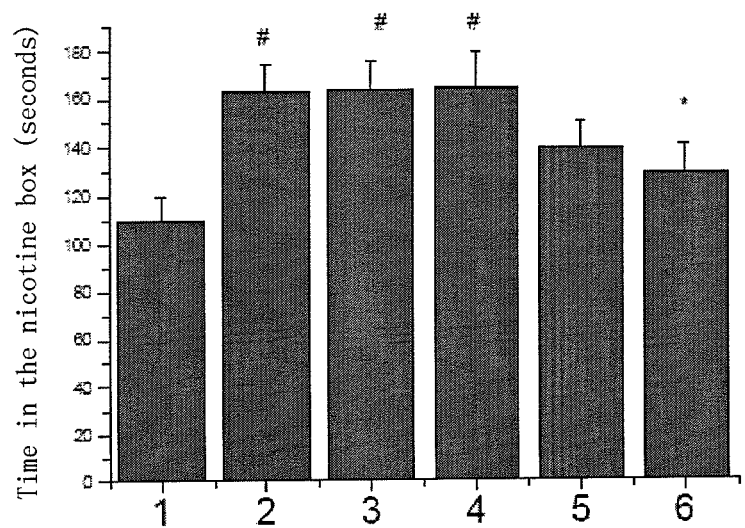
FIG. 5 shows the effect of glutamic acid and theanine on nicotine-dependency of mice. 1. Control; 2. Nicotine; 3. Nicotine+tea polyphenol; 4. Nicotine+caffeine; 5. Nicotine+glutamic acid and theanine in a low concentration; 6. Nicotine+glutamic acid and theanine in a high concentration. # As compared with the control, $P<0.01$, *As compared with nicotine, $P<0.05$.

6. Inhibition of glutamic acid and theanine against the enhancement of nicotine-induced tyrosine hydroxylase expression and dopamine release in the brain regions of mice Dopamine release in the brain of smokers was the important result of nicotine dependency. When testing dopamine release primarily in ventral tegmental areas of mice with body-brain electrode, it was found that dopamine release primarily in ventral tegmental areas of mice two weeks after injection with nicotine was obviously increased, while the enhancement of dopamine release in ventral tegmental areas of mice injected with glutamic acid and theanine (No. 1) was obviously inhibited (FIG. 5A).

Tyrosine hydroxylase is a rate-limiting enzyme for the synthesis of dopamine, so that the change of such enzyme was tested. The results showed that the tyrosine hydroxylase expression primarily in ventral tegmental areas of mice having an obvious nicotine dependency two weeks after injection with nicotine was obviously increased, while the enhancement of tyrosine hydroxylase expression in ventral tegmental areas of mice injected with glutamic acid and theanine (No. 1) was obviously inhibited (FIG. 5B).

Figure 6A:
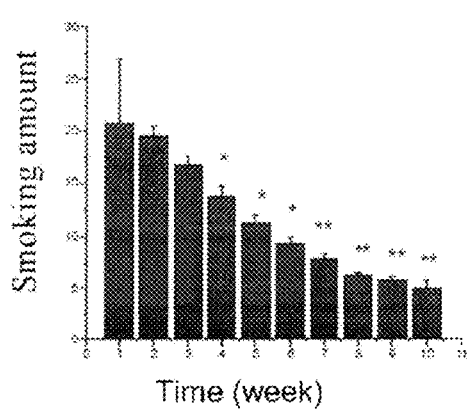
FIGS. 6A and B respectively show the effect of the independent, tobacco addiction-dispelling and tobacco toxicity-detoxifying filter rod and cigarette holder on the average smoking amount of the volunteers per day. A. Average smoking amount of the tea-cigarette filter tip group; B. Reduction ratio of the smoking amount of the tea-cigarette filter tip group; 1. before smoking cigarettes with tea-cigarette filter tip; 2-9. First to eighth weeks after smoking cigarettes with tea-cigarette filter tip. * As compared with the control, $P<0.01$, **As compared with nicotine, $P<0.01$.

7. Effect of glutamic acid and theanine on the nicotine-induced sugar metabolism activity in the brain region of mice Nicotine may induce the enhancement of sugar metabolism activity in the brain region. The inhibition of glutamic acid and theanine (No. 1) against the enhancement of the nicotine-induced sugar metabolism activity in the brain region of mice was detected by PET. The results showed that mice having an apparent nicotine dependency two weeks after injection with nicotine had obvious enhancement of sugar metabolism activity in the main brain regions, and the enhancement of the sugar metabolism activity of mice injected with glutamic acid and theanine in such brain regions was obviously inhibited (see FIG. 6A).

Figure 6B:
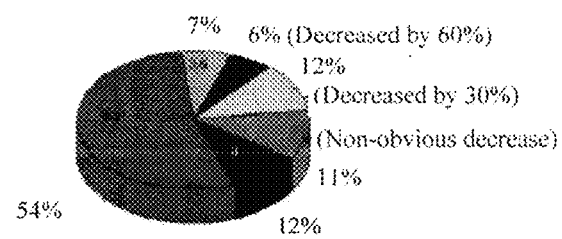
Figure 8D:
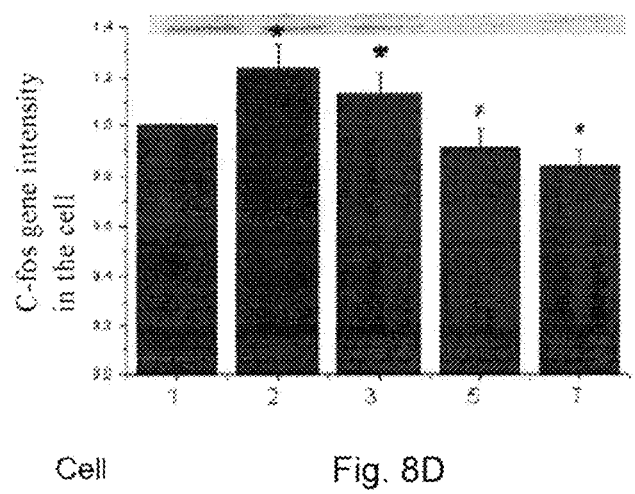
Figure 9A:
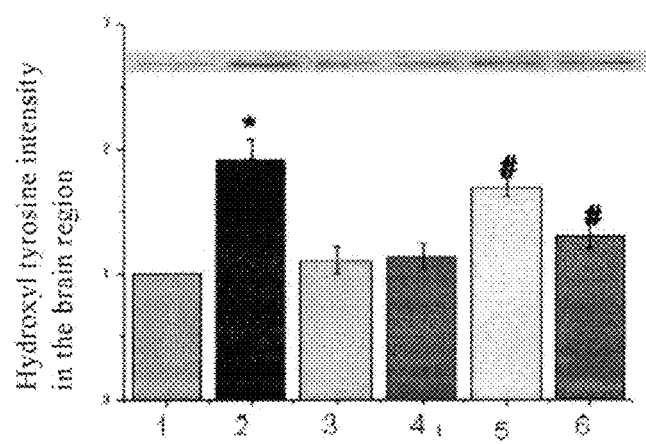
FIG. 9 shows the effect of theanine on the nicotine-induced tyrosine hydroxylase receptor expression and dopamine release in the ventral tegmental areas of mice. Effect of theanine on the nicotine-induced cell tyrosine hydroxylase receptor expression in A: Ventral tegmental areas and B: SY5Y of mice. 1. Control; 2. Nicotine; 3. Nicotine+tea polyphenol; 4. Nicotine+caffeine; 5. Nicotine+glutamic acid and theanine in a low concentration; 6. Nicotine+glutamic acid and theanine in a high concentration; 7. Nicotine receptor inhibitor.
Figure 9B:
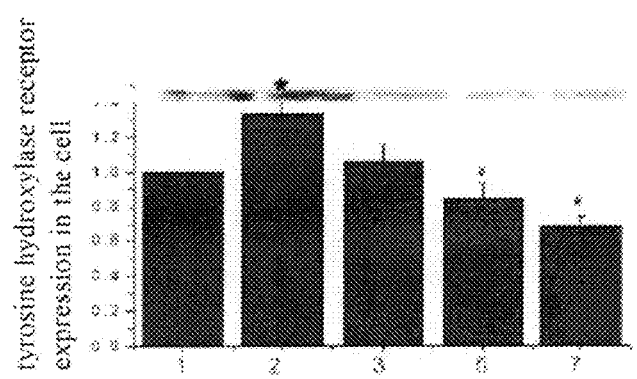
Figure 10A:
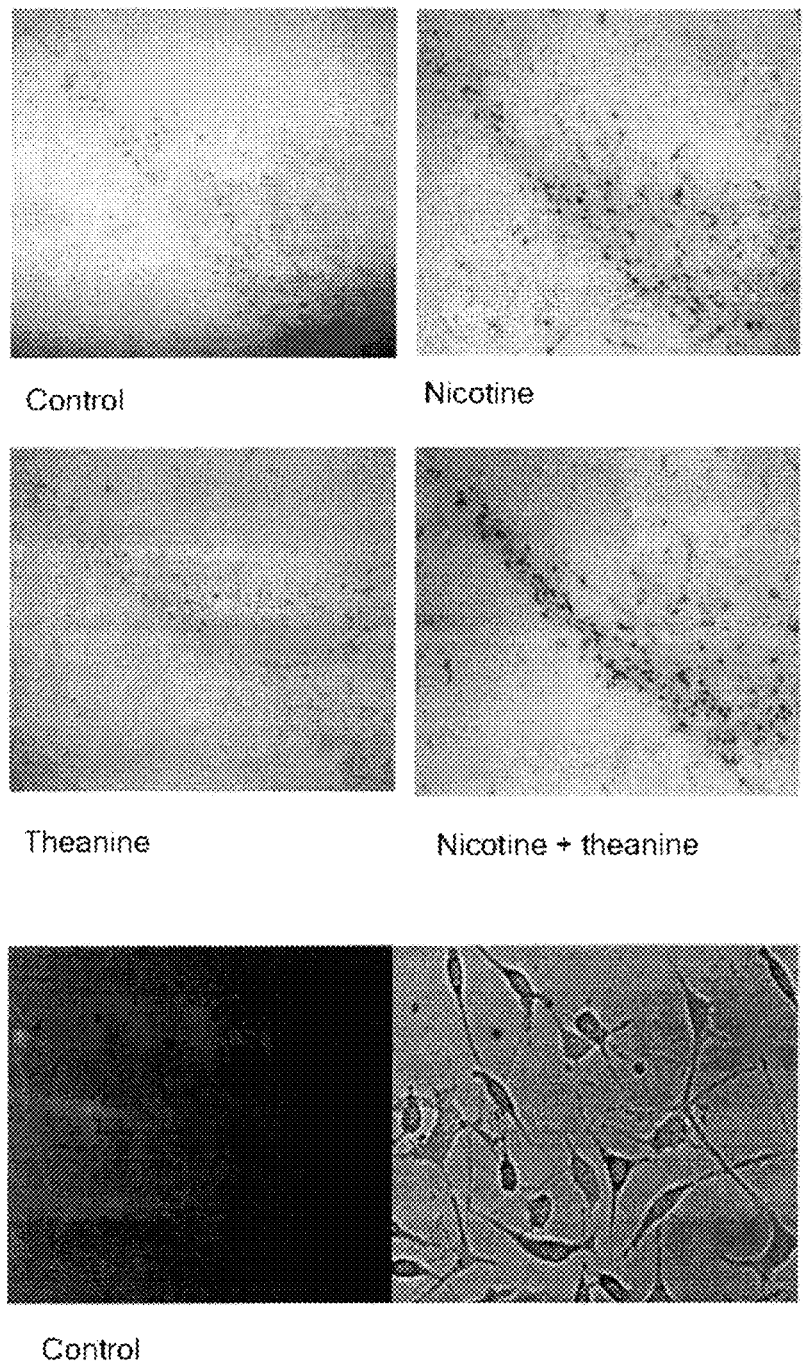
FIG. 10 shows the effect of glutamic acid and theanine on the nicotine-induced sugar metabolism activity in the brain regions (A) and SY5Y cells (B) of mice. *As compared with the control, P<0.01, #As compared with nicotine, P<0.05.
Figure 10B:
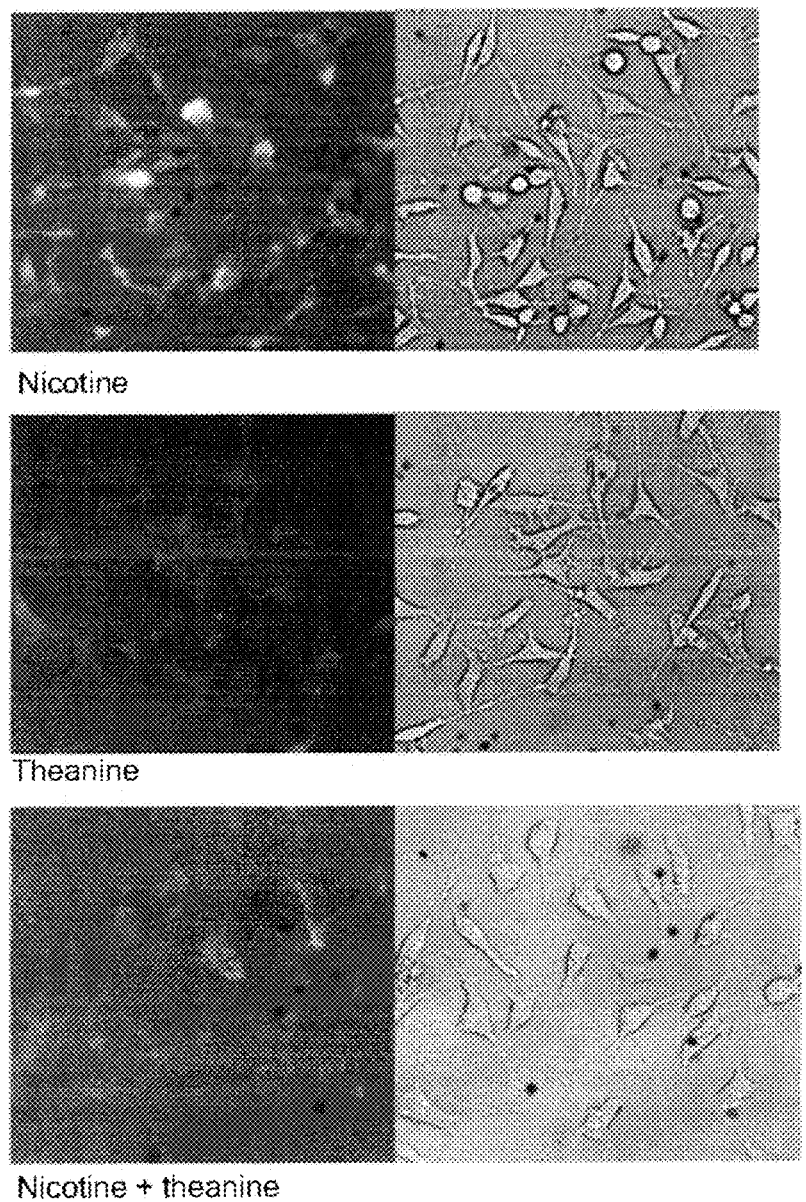
Figure 11:
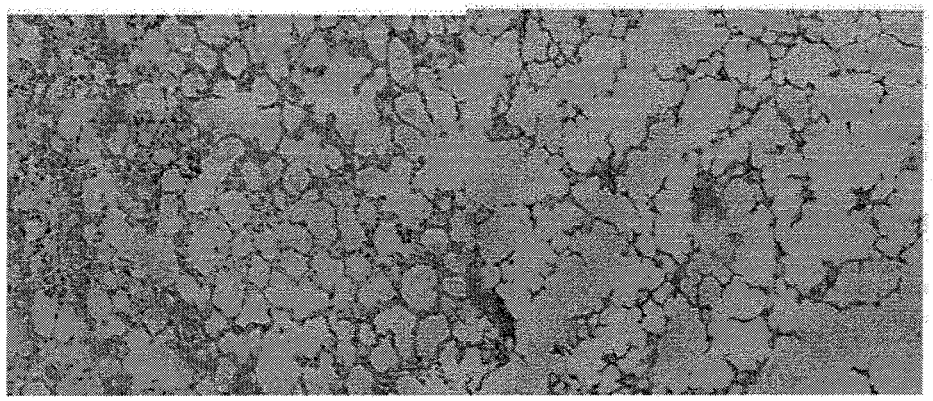
FIG. 11 shows the effect of tea filter rod on pathological changes of lung tissue of rats caused by smoking.
Figure 11:
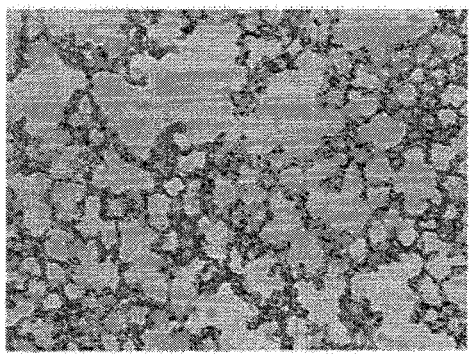

In addition, SY5Y was used to make studies on the inhibition of glutamic acid and theanine (No. 1) against the enhancement of the nicotine-induced sugar metabolism activity of nerve cells. The results showed that nicotine could significantly increase the sugar metabolism activity of cells, and the enhancement of the sugar metabolism activity of cells treated simultaneously with glutamic acid and theanine was significantly inhibited (FIG. 6B).

8. Tea filter rod and cigarette holder can obviously decrease the acute and chronic toxicity produced by smoking.

Effect of tea filer rod and cigarette holder on pathological changes of lung tissue of rats caused by smoking: 80% of mice in the control group had significant lung tissue damage, pulmonary overinflation and pulmonary hemorrhage, dilatation and congestion of renal interstitial minute vessels, slight dilatation and hemorrhage of hepatic lobule central veins or interlobular veins, and heart and spleen remained normal. Mice smoking cigarette with tea slice filter rod and cigarette holder: 20% of mice also had dilation and hemorrhage of mesenchyme minute vessels and renal interstitial minute vessels, slight dilatation and hemorrhage of hepatic lobule central veins or interlobular veins; and heart and spleen remained normal (see FIG. 7).

TABLE 1

Effects of two cigarette smokes on survival time of mice

| Group | Amount | Body weight | Survival time | Increased by |
|---|---|---|---|---|
| Control cigarette | 8 | 28.5 ± 1.9 | 11.5 ± 1.8 | |
| Composite tea filter rod smoke group | 8 | 27.6 ± 1.5 | 14.9 ± 2.2 | 32.2% |
| Whole-tea filter rod group | 8 | 29.5 ± 1.5 | 18.0 ± 1.9 | 60.0% |

TABLE 2

Effect of smoke from tea particle cigarette holder on micronucleus rate of marrow cell of rats

| Group | Amount | Micronucleus Rate | Decreased by |
|---|---|---|---|
| Control group | 10 | 1.85 ± 1.42 | |
| Control smoke group | 10 | 8.55 ± 1.06 | |
| Tea filter rod smoke group | 10 | 4.56 ± 2.10 | 46% |

As will be realized, the invention is capable of other and different embodiments, and its several details are capable of modifications in various obvious respects, all without departing from the essence of the invention. There is within the scope of the invention, a filter for dispelling tobacco addiction and detoxifying tobacco toxicity, characterized in that the filter comprises one or more active ingredients selected from the group consisting of Y-aminobutyric acid, theanine, glutamic acid, tryptophan and tea alkaloid. The filter may further comprise tea powder, tea particles or tea slices, preferably tea particles or tea slices. The tea slices may readily be chosen to have a unit area weight of 25-55 g/m2, a width of 180-380 mm, a moisture content of 5-8 wt %, and a wrinkle space of 0.8-1.8 mm. The tea particles may have a particle size of 0.001-0.18 mm and a moisture content of 5-8 wt %. The filter may also comprise theanine and/or glutamic acid. The filter may further comprise one or more additives selected from the group consisting of bupropion, varenicline, varenicline, rimonabant, dihydroerysodine, dopamine, mecamylamine, chlofazoline, cytisine, 3-methylaminoisocamphane, baclofen and butanone. In another embodiment of the invention, a cigarette filter rod comprises the filter described above and preferably in the filament tow form, as the exclusive filler. The filter rod may also comprise the filter and a conventional filler, such as cellulose acetate filament tow; preferably, the filter and conventional filler are alternately and sectionally filled in the filter rod. In another embodiment of the invention, a cigarette holder comprises the filter described above and the filter composes the insertion part for the insertion of cigarette, intermediate part and/or smoking part of the cigarette. The filter may also compose the whole cigarette holder. In another embodiment of the invention, a bullet core comprises the filter described above which is in a conventional capsule form and is characterized in that there is one or more pores at two ends of the capsule. The bullet core may be a spiral bullet core having a plurality of, such as 6, spiral openings at the bottom of the bullet core. The bullet core may also comprise a sensor, a processor, and a heater. A further embodiment of the invention may be a filter rod kit comprising a cigarette filter rod and a bullet core, wherein the bullet core is mounted in the cigarette filer rod. A further embodiment of the invention may be a cigarette holder kit comprising a cigarette holder and a bullet core, wherein the bullet core is comprised in the cigarette holder. The cigarette holder may further comprise a magazine matching the bullet core, and the cigarette holder can be opened so as to enable the bullet core to be filled in the magazine. There is further within the scope of the invention a process for manufacturing the cigarette filter rod, characterized in that the filler is inserted into the upper end of a prefabricated and vertically placed cylinder or a plurality of cylinders distributed in parallel. The filter may be inserted as the exclusive filler into the cylinder or the filter and a conventional filler are alternately inserted into the cylinder. There is further within the scope of the invention a cigarette, chewing tobacco, or snuffing tobacco any of which may comprise the filter. There is further within the scope of the invention a method of use of the filter for dispelling tobacco addiction, characterized in, by heating the filter, enabling the active ingredients in the filter to enter respiratory tract by smoking.

The invention claimed is:

1. A filter for dispelling tobacco addiction and detoxifying tobacco toxicity, said filter consisting of: sliced tea leaves having a unit area weight after slicing of 25-55 g/m$^2$, a moisture content of 5-8 wt %, and a wrinkle space of 0.8-1.8 mm and one or more active ingredients selected from the group consisting of theanine, glutamic acid, and combinations thereof, said filter configured for dispelling addiction of a user to tobacco smoke, said sliced tea leaves having been calendared prior to slicing into a web of tea leaves having a width of 180-380 mm.

2. The filter of claim 1 wherein said filter is disposed in a cigarette filter rod.

3. The filter of claim 2, wherein said filter s in the filament tow form.

4. The filter of claim 2 wherein the filter rod comprises the filter and a cellulose acetate filament tow filter; wherein said filter and said cellulose acetate filament tow filter are alternately and sectionally filled in the filter rod.

* * * * *